(No Model.)
L. T. SHELTON.
AX AND BRUSH HOOK.
No. 260,423. Patented July 4, 1882.
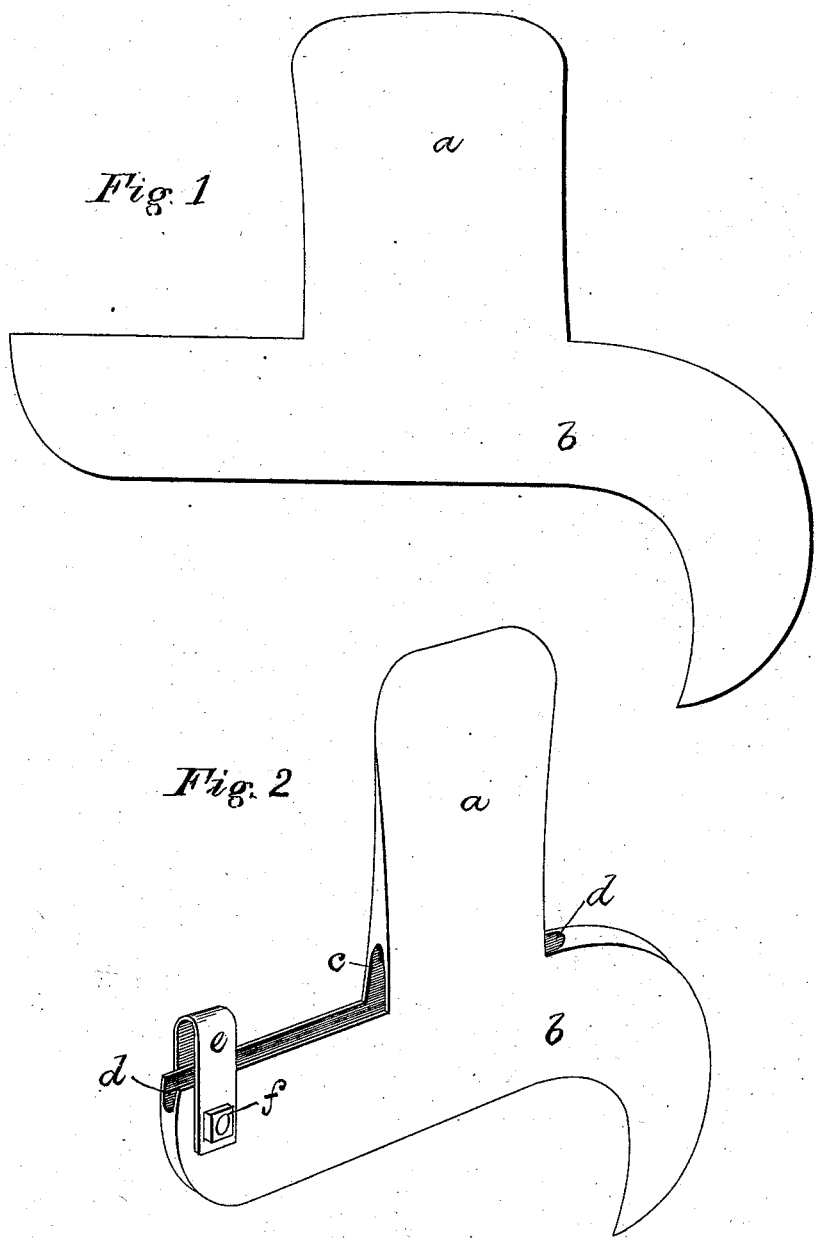
Witnesses
C. E. Jones
Robt Brown
Inventor
Levi T. Shelton
By Chas J. Gooch
attorney

UNITED STATES PATENT OFFICE.

LEVI T. SHELTON, OF OAKLAND, WASHINGTON TERRITORY.

AX AND BRUSH-HOOK.

SPECIFICATION forming part of Letters Patent No. 260,423, dated July 4, 1882.

Application filed November 21, 1881. (No model.)

*To all whom it may concern:*

Be it known that I, LEVI T. SHELTON, of Oakland, in the county of Mason, Washington Territory, have invented certain new and useful Improvements in Swamping-Axes, of which the following is a specification, reference being had to the drawings hereunto annexed.

My invention consists in certain improvements, as hereinafter described and claimed, in swamping-axes.

What is technically known by those engaged in logging or lumbering as a "swamping-ax" consists of a tool combining an ordinary chopping-ax and the common brush-hook. "Swamping" is a term used by loggers to designate the cutting of saplings and brush from roads leading from the main logging-road to the places where trees have been felled and sawed up into "saw-logs;" and the manner of swamping is by cutting saplings with a common chopping-ax and the smaller brush with a common brush-hook, each tool being either separate from the other or combined in one implement.

In the drawings, Figure 1 represents a side elevation, and Fig. 2 perspective view, of my improved swamping-ax and brush-hook.

$a$ represents the bit or blade of the ax. $b$ is the blade of the brush-hook. $c$ is the ax-eye, and $d$ is a groove formed in the back of the brush-hook, and running longitudinally thereof from the rear end to the front curved portion. The handle is inserted within this groove $d$ and eye $c$, and is held securely in place by a strap or band of iron or other suitable material, $e$, at the upper or inner end of the brush-hook, said band or strap being rigidly secured to the brush-hook by bolts or rivets $f$. This band or strap $e$ will securely hold the handle within the groove and prevent said handle from springing and breaking the eye of the ax.

What I claim as my invention is—

A combined swamping-ax and brush-hook consisting of the ax $a$, brush-hook $b$, having longitudinal groove $d$, and the handle-retaining strap or band $e$, substantially as and for the purpose set forth.

LEVI T. SHELTON.

Witnesses:
 N. S. PORTER,
 G. C. ISRAEL.